US011909111B2

(12) United States Patent
Colapietro et al.

(10) Patent No.: US 11,909,111 B2
(45) **Date of Patent: *Feb. 20, 2024**

(54) SMALL CELL BASE STATION INTEGRATED WITH STOREFRONT SIGN

(71) Applicant: CommScope Technologies LLC, Hickory, NC (US)

(72) Inventors: Julian Colapietro, McKinney, TX (US); Charles John Mann, Omaha, NE (US); Michael Fabbri, Des Plaines, IL (US); Jeffrey Cook, Allen, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/422,969

(22) PCT Filed: Jan. 17, 2020

(86) PCT No.: PCT/US2020/014024

§ 371 (c)(1),
(2) Date: Jul. 14, 2021

(87) PCT Pub. No.: WO2020/150569

PCT Pub. Date: Jul. 23, 2020

(65) Prior Publication Data

US 2022/0077563 A1 Mar. 10, 2022

Related U.S. Application Data

(60) Provisional application No. 62/794,221, filed on Jan. 18, 2019.

(51) Int. Cl.
*H01Q 13/18* (2006.01)
*H01Q 1/06* (2006.01)
(Continued)

(52) U.S. Cl.
CPC ......... *H01Q 13/18* (2013.01); *G09F 13/0413* (2013.01); *H01Q 1/06* (2013.01);
(Continued)

(58) Field of Classification Search
CPC ........ H01Q 1/06; H01Q 1/221; H01Q 1/1242; H01Q 9/0407; H01Q 13/18; H01Q 21/0087; H01Q 21/28
See application file for complete search history.

(56) References Cited

U.S. PATENT DOCUMENTS 2,935,598 A 5/1960 Dempsey
4,196,976 A 4/1980 Hoffman
(Continued)

FOREIGN PATENT DOCUMENTS

CN 2309600 Y 3/1999
CN 201515001 U 6/2010
(Continued)

OTHER PUBLICATIONS

"International Search Report and Written Opinion corresponding to International Application No. PCT/US2020/014024 dated May 21, 2020".

(Continued)

*Primary Examiner* — Hoang V Nguyen
(74) *Attorney, Agent, or Firm* — Myers Bigel, P.A.

(57) ABSTRACT

An assembly includes: a) a housing comprising a floor, a ceiling, a rear wall, a front wall, and opposed side walls that define a cavity, wherein the side walls include illuminable informational markings; an antenna; c) a radio residing in the cavity of the housing connected with the antenna; and d) a power source attached to the radio; wherein the power source is employed to illuminate the informational markings.

18 Claims, 7 Drawing Sheets

(51) Int. Cl.

| | |
|---|---|
| ***H01Q 1/38*** | (2006.01) |
| ***H01Q 1/12*** | (2006.01) |
| ***H01Q 21/28*** | (2006.01) |
| ***H01Q 21/00*** | (2006.01) |
| ***G09F 13/04*** | (2006.01) |
| ***H01Q 9/04*** | (2006.01) |

(52) U.S. Cl.

CPC ......... *H01Q 1/1221* (2013.01); *H01Q 1/1242* (2013.01); *H01Q 1/38* (2013.01); *H01Q 9/0407* (2013.01); *H01Q 21/0087* (2013.01); *H01Q 21/28* (2013.01)

(56) References Cited

U.S. PATENT DOCUMENTS

| | | | |
|---|---|---|---|
| 5,049,891 | A | 9/1991 | Ettinger et al. |
| 5,612,741 | A | 3/1997 | Loban et al. |
| 5,926,145 | A | 7/1999 | Honma |
| 6,092,318 | A | 7/2000 | Arie et al. |
| 6,222,503 | B1 | 4/2001 | Gietema et al. |
| 6,298,589 | B1 | 10/2001 | Hillstrom |
| 7,671,814 | B2 | 3/2010 | Savage et al. |
| 8,254,338 | B2 | 8/2012 | Anschutz et al. |
| 9,564,049 | B2 | 2/2017 | Diba |
| 9,781,246 | B2 | 10/2017 | Das et al. |
| 10,492,332 | B2 | 11/2019 | Hendrix et al. |
| 2004/0164911 | A1 | 8/2004 | Sun et al. |
| 2005/0282586 | A1 | 12/2005 | Rutherford et al. |
| 2006/0070281 | A1 | 4/2006 | Passannante |
| 2008/0089288 | A1 | 4/2008 | Anschutz et al. |
| 2009/0135074 | A1 | 5/2009 | Yang et al. |
| 2010/0231469 | A1 | 9/2010 | Duk-Yong |
| 2011/0307309 | A1 | 12/2011 | Forster et al. |
| 2013/0201685 | A1 | 8/2013 | Messmore et al. |
| 2014/0217248 | A1 | 8/2014 | Kato et al. |
| 2014/0267896 | A1 | 9/2014 | Cox et al. |
| 2014/0274076 | A1 | 9/2014 | Hyslop et al. |
| 2014/0378047 | A1 | 12/2014 | Kennard |
| 2015/0031372 | A1 | 1/2015 | Foerster et al. |
| 2015/0177374 | A1 | 6/2015 | Driscoll et al. |
| 2015/0303585 | A1 | 10/2015 | Chistyakov et al. |
| 2015/0349399 | A1 | 12/2015 | Lasier et al. |
| 2015/0371571 | A1 | 12/2015 | Häger |
| 2017/0324154 | A1 | 11/2017 | Hendrix et al. |
| 2017/0352952 | A1 | 12/2017 | Weiler et al. |
| 2018/0062247 | A1 | 3/2018 | Umbert |
| 2018/0102833 | A1 | 4/2018 | Ling |
| 2019/0115664 | A1 | 4/2019 | Veihl et al. |

FOREIGN PATENT DOCUMENTS

| | | | | |
|---|---|---|---|---|
| CN | 201918491 | U | 8/2011 | |
| CN | 202749055 | U | 2/2013 | |
| CN | 203573598 | U | 4/2014 | |
| CN | 204315209 | U | 5/2015 | |
| CN | 204665082 | U | 9/2015 | |
| EP | 2196985 | A1 | 6/2010 | |
| EP | 3618041 | A1 * | 3/2020 | ........... G09F 13/005 |
| ES | 1219883 | U | 10/2018 | |
| GR | 1004520 | B | 4/2004 | |
| JP | 2005283889 | A | 10/2005 | |
| JP | 3185100 | U | 7/2013 | |
| JP | 3185100 | U | 8/2013 | |
| KR | 101013842 | B1 | 2/2011 | |
| WO | 2012067419 | A2 | 5/2012 | |
| WO | 2014132233 | A2 | 9/2014 | |
| WO | 2016040745 | A1 | 3/2016 | |

OTHER PUBLICATIONS

"Examination Report corresponding to European Patent Application No. 17793259.7 dated Jul. 9, 2021".

"Extended European Search Report issued in corresponding European Patent Application No. 17793259.7, dated Feb. 17, 2020 (9 pages)."

"Notification of Transmittal of the International Search Report and the Written Opinion of the International Searching Authority, or the Declaration corresponding to International Application No. PCT/US2017/030854; dated Aug. 8, 2017".

"International Preliminary Report on Patentability corresponding to International Application No. PCT/US2020/014024 dated Jul. 29, 2021".

"Extended European Search Report corresponding to European Application No. 20741860.9 dated Aug. 31, 2022".

* cited by examiner

SMALL CELL BASE STATION INTEGRATED WITH STOREFRONT SIGN

RELATED APPLICATION

The present application is a 35 U.S.C. § 371 national phase application of PCT Application PCT/US2020/014024, filed Jan. 17, 2020, which claims priority from and the benefit of U.S. Provisional Patent Application No. 62/794, 221, filed Jan. 18, 2019, the disclosure of which is hereby incorporated herein by reference in full.

FIELD OF THE INVENTION

Aspects of the present disclosure relate to cellular communications systems, including distributed antenna systems, communications systems that include small cell radio base stations, and communication systems that include macro cell radio base stations.

BACKGROUND

Cellular communications systems are well known in the art. In a typical cellular communications system, a geographic area may be divided into a series of regions that are referred to as "cells," and each cell is served by a base station. Typically, a cell may serve users who are within a distance of, for example, 2-20 kilometers from the base station, although smaller cells are typically used in urban areas to increase capacity. The base station may include baseband equipment, radios and antennas that are configured to provide two-way radio frequency ("RF") communications with mobile subscribers that are positioned throughout the cell. In many cases, the cell may be divided into a plurality of "sectors," and separate antennas may provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have, in recent years, been deploying so-called "small cell" cellular base stations. A small cell base station refers to a low-power base station that may operate in the licensed and/or unlicensed spectrum that has a much smaller range than a typical "macrocell" base station. A small cell base station may be designed to serve users who are within short distances from the small cell base station (e.g., tens or hundreds of meters). Small cells may be used, for example, to provide cellular coverage to high traffic areas within a macrocell, which allows the macrocell base station to offload much or all of the traffic in the vicinity of the small cell to the small cell base station. Small cells may be particularly effective in Long Term Evolution ("LTE") cellular networks in efficiently using the available frequency spectrum to maximize network capacity at a reasonable cost. Small cell base stations typically employ an antenna that provides full 360 degree coverage in the azimuth plane and a suitable beamwidth in the elevation plane to cover the designed area of the small cell. In many cases, the small cell antenna will be designed to have a small downtilt in the elevation plane to reduce spill-over of the antenna beam of the small cell antenna into regions that are outside the small cell and also for reducing interference between the small cell and the overlaid macro cell.

FIG. 1 is a schematic diagram of a conventional small cell base station 10. As shown in FIG. 1, the base station 10 includes an antenna 20 that may be mounted on a raised structure 30. The antenna 20 may have an omnidirectional antenna pattern in the azimuth plane, meaning that the antenna beam(s) generated by the antenna 20 may extend through a full 360 degree circle in the azimuth plane.

As is further shown in FIG. 1, the small cell base station 10 also includes base station equipment such as baseband units 40 and radios 42. A single baseband unit 40 and a single radio 42 are shown in FIG. 1 to simplify the drawing. Additionally, while the radio 42 is shown as being co-located with the baseband equipment 40 at the bottom of the antenna tower 30, it will be appreciated that in other cases the radio 42 may be a remote radio head that is mounted on the antenna tower 30 adjacent the antenna 20. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. The base station 10 of FIG. 1 will typically include various other equipment (not shown) such as, for example, a power supply, back-up batteries, a power bus and the like.

It may be desirable to provide small cell antennas in different environments that capitalize on the presence of current structures.

SUMMARY

As a first aspect, embodiments of the invention are directed to an assembly comprising: (a) a housing comprising a floor, a ceiling, a rear wall, a front wall, and opposed side walls that define a cavity, wherein the side walls include illuminable informational markings; (b) an antenna; (c) a radio residing in the cavity of the housing connected with the antenna; and (d) a power source attached to the radio. The power source is employed to illuminate the informational markings.

Such an assembly may be suitable for mounting on a storefront as an advertising banner.

DETAILED DESCRIPTION

Figure 1A:
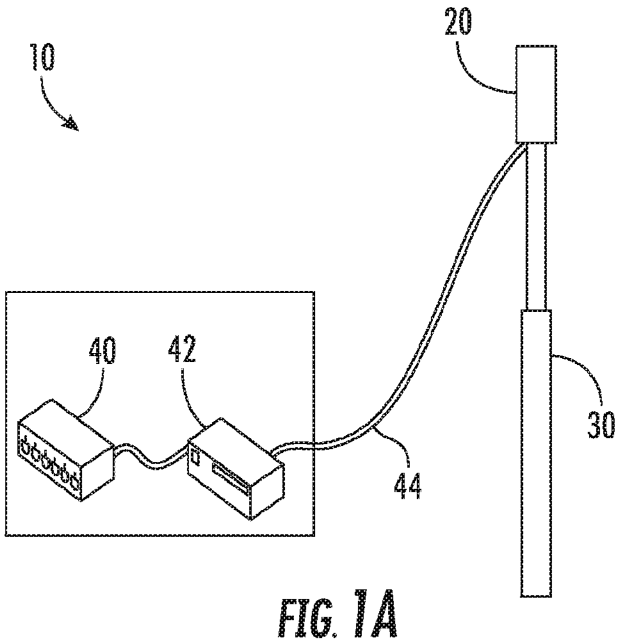
FIG. 1 is a simplified schematic diagram illustrating a conventional small cell cellular base station.

Aspects of the present disclosure are described below with reference to the accompanying drawings. The present disclosure is not limited to the illustrated embodiments; rather, these embodiments are intended to fully and completely convey to those skilled in this art how to make and use the teachings of the present disclosure. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of devices described herein in use or operation in addition to the orientation depicted in the figures. For example, if a device in the figures is turned over, elements described as "under" or "beneath" other elements or features would then be oriented "over" the other elements or features, Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Figure 2:
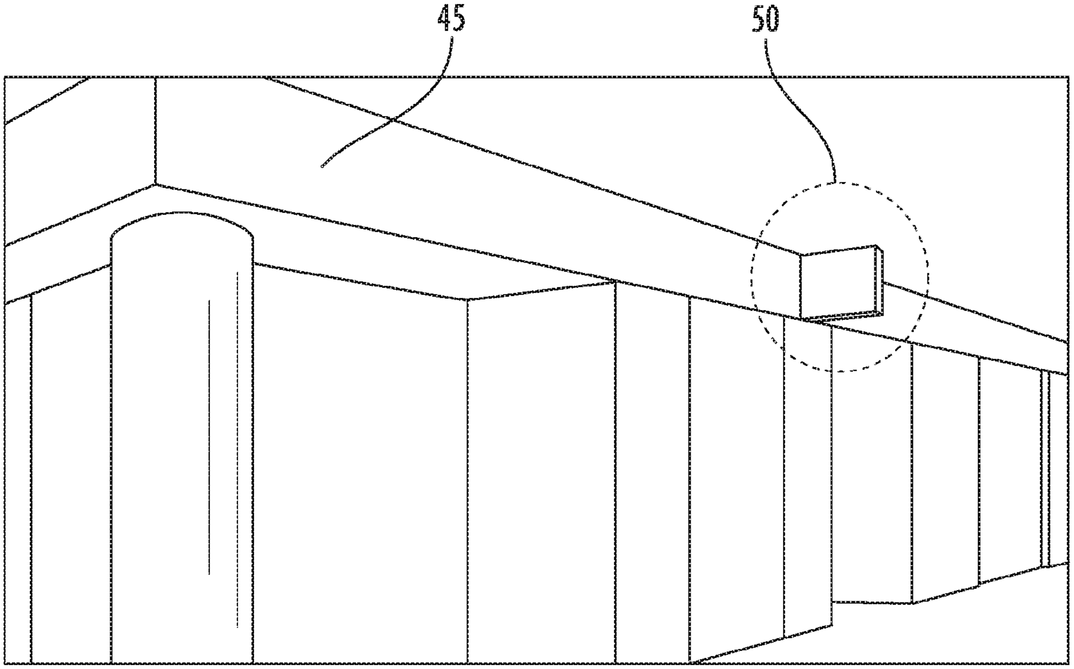
FIG. 2 is a perspective view of an advertising banner attached to a storefront sign.

Referring now to the figures, FIG. 2 illustrates a storefront sign 45 with an advertising banner 50 that extends therefrom. The advertising banner 50 is typically mounted on streetside storefronts such as banks, restaurants, retails shops, and the like, and can be used for advertising for either the business itself or another outlet (e.g., another business, a non-profit organization, a school, etc.) The advertising banner 50 is typically illuminated, and therefore is supplied with electrical power, and often is serviced with fiber optic cable as well.

Figure 3:
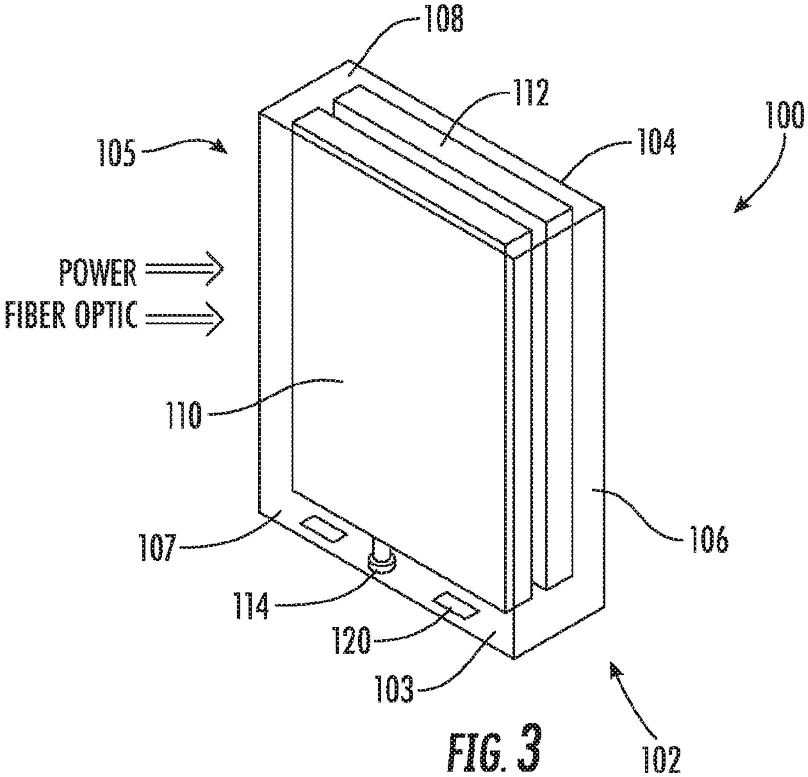
FIG. 3 is a schematic perspective view of an advertising banner with a small cell base station according to embodiments of the invention.

Referring now to FIG. 3, an assembly 100 is shown therein. As can be visualized by examination of FIG. 3, the assembly 100 includes a housing 102 that functions as an advertising banner. The housing 102 includes side walls 103, 104, a rear wall 105, a front wall 106, a floor 107 and a ceiling 108. Typically, the housing 102 has dimensions of approximately 50 cm×50 cm×20 cm, but other dimensions may also be suitable.

Typically at least the side walls 103, 104 include informational markings that constitute advertising or other informational messaging; these markings are on display when the assembly 100 is mounted on a storefront or other location. The assembly 100 also includes LEDs 120 mounted to the floor 107. The LEDs 120 provide light to illuminate the markings on the housing 102 to make them more visible, more aesthetically appealing, etc.

Within the cavity of the housing 102, two telecommunications radios 110, 112 are mounted. Each of the radios 110, 112 is attached to an antenna 114 (only one antenna 114 is shown herein) to enable the radios 110, 112 to transmit and receive telecommunications signals. As shown schematically in FIG. 3, the assembly 100 is connected with power and fiber optic sources. As such, the assembly 100 is able to function as a small cell base station as well as an advertising banner. It will be understood that the assembly 100 may also include other telecommunications equipment (e.g., processors, backhaul components, cables, batteries, and the like) that can facilitate the transmission and/or reception of signals.

Figure 4:
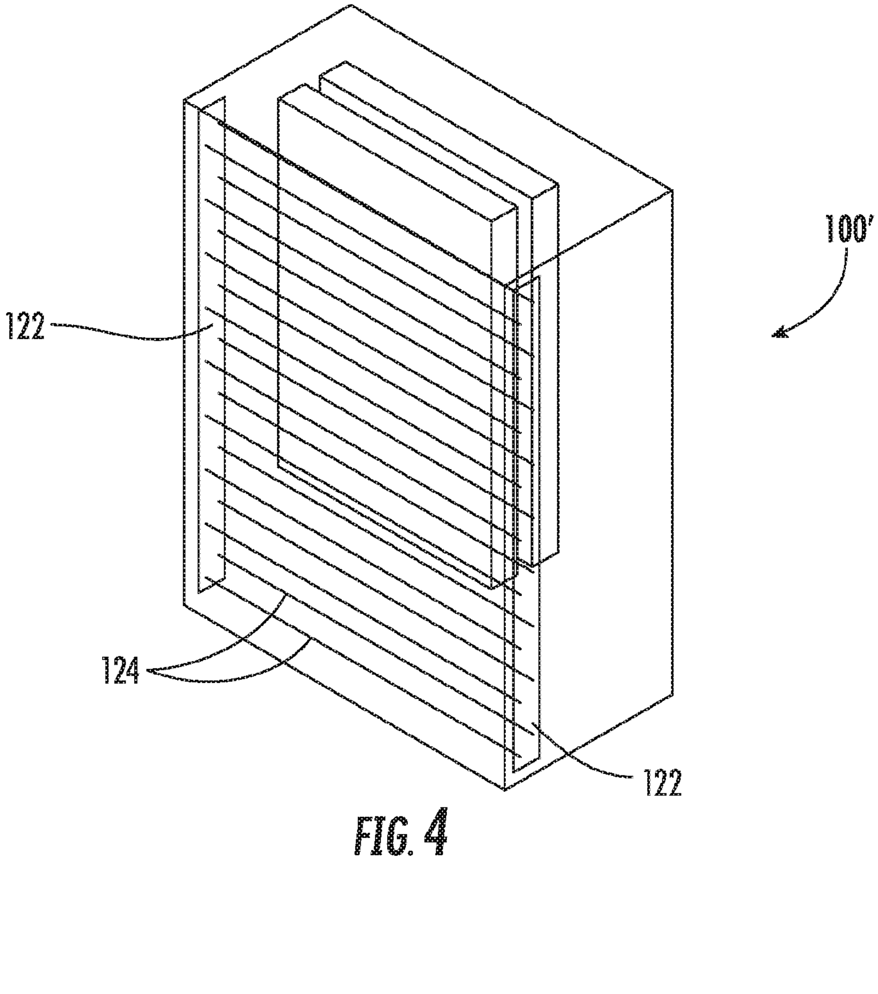
FIG. 4 is a schematic perspective view of another advertising banner with a small cell base station according to embodiments of the invention.

Those skilled in this art will appreciate that the assembly 100 may take a number of different forms. For example, in some embodiments the LEDs 120 as positioned in FIG. 3 may create passive intermodulation (PIM), which is undesirable, particularly for RF transmissions at higher frequencies. FIG. 4 illustrates an assembly 100' in which the LEDs 120 are not present, but are replaced with vertically-oriented LED strips 122 that are mounted in the front and rear corners of the housing 102. The LED strips 122 are supplied with light from lightpipe bars 124. By moving the LEDs away from the vicinity of the radios and antennas, unwanted PIM can be reduced or eliminated.

Figure 5:
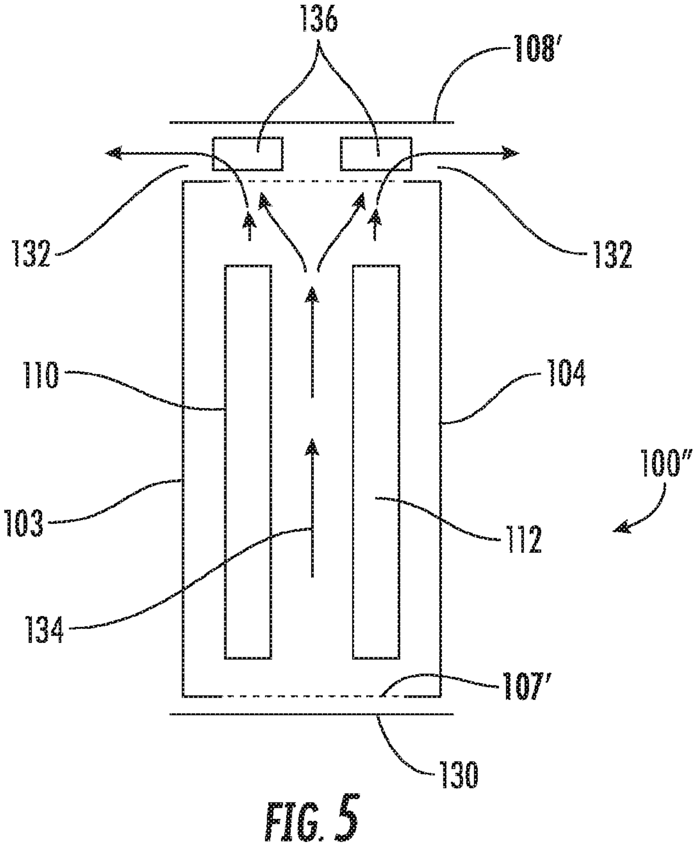
FIG. 5 is a schematic perspective view of another advertising banner with a small cell base station according to embodiments of the invention.

FIG. 5 illustrates an assembly 100" that includes provision for cooling. Radios and other equipment of base station antennas can generate considerable heat during operation, and therefore may require cooling. The assembly 100" includes a perforated floor 107' that is covered by an air filter 130. The ceiling 108' is raised slightly above the side walls 103, 104 to form gaps 132. As shown by the arrows 134, air can flow upwardly through the filter 130 and floor 107', past the radios 110, 112 to provide cooling, and out of the gaps 132. In some embodiments cooling is enhanced by blowers 136 (e.g., fans) that are mounted in the ceiling to draw air upwardly.

The assembly 100" may also employ different methodologies for enhancing cooling. In some embodiments, the radios 110, 112 may be separated from each other such that each has its own chamber and its own blower(s). The blower may then be controllable to be used only when the radio associated with it requires cooling.

Alternatively, rather than the radios 110, 112 being fully separated from each other, baffles or other air-directing elements may be included in the housing 102 to enhance the cooling effect of air flowing through the housing 102.

As another alternative, radios 110, 112 may be separated from other equipment that generates less heat, such that cooling is directed to the equipment with a greater need for cooling.

Different alternative arrangements for equipment and cooling are discussed with respect to electronics cabinets in U.S. patent application Ser. No. 16/057,359, filed Aug. 7, 2018, the disclosure of which is hereby incorporated by reference herein, and may be applicable herein.

As another alternative, the ceiling 108' may need to function as a rain guard or cap to prevent environmental elements (such as rain, dirt, insects, and the like) from entering the cavity of the housing 102. Thus, as shown the ceiling 108' may have side edges that extend laterally beyond the side walls 103, 104 (much like the eaves on a dwelling) to prevent entry from unwanted elements.

As a further alternative, the floor 107 and/or any air filter 130 may be formed of material that dampens sound (particularly if blowers are included, as they can create noise).

It may further be desirable to modify the manner in which power and fiber optic capabilities are provided to the assembly 100. For example, rather than having a single power port and single optical port entering the housing 102, it may be desirable to include a distribution panel or hub (not shown) that would allow a technician to connect or disconnect a particular radio or other equipment without impacting the other equipment. Some embodiments may also include a surge protector to prevent damage to the radios, etc., from unexpected power surges.

In addition to cooling concerns, other embodiments of the assembly 100 may include arrangements of radios, antennas and/or other equipment to address other concerns or provide additional functionality. As an example, in some embodiments the radios 110, 112 may be located adjacent one side wall 103, with other equipment (e.g., power or backhaul equipment) being located nearer the other side wall 104. The side wall 103 may include one or more access doors that enable a technician to easily access the radios 110, 112, while the equipment that typically requires less frequent attention/maintenance is located near the side wall 104.

In such an arrangement (or even in a different arrangement), in some embodiments the radios 110, 112 may reside in their own separate, secure chambers, each with its own secured access door. In such a configuration each of the radios 110, 112 may be owned by a different operator, who can be assured that access to his radio is available to only him.

Figure 6:
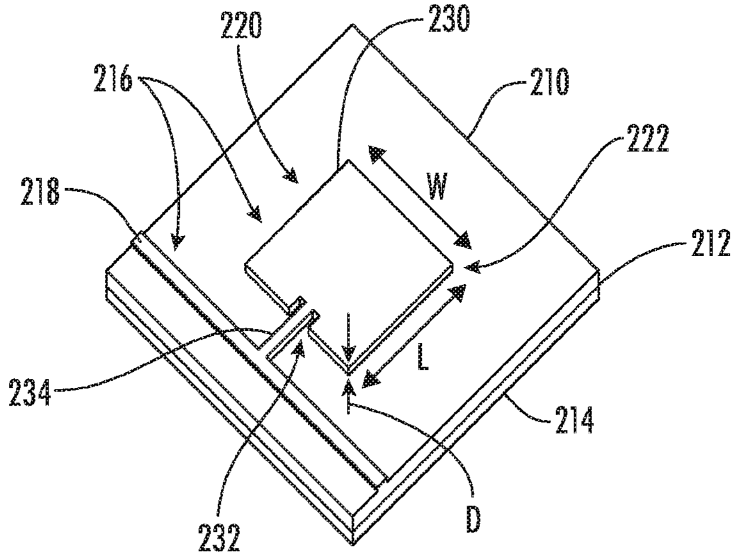
FIG. 6 is a perspective view of an exemplary patch radiating element for an antenna of a small cell base station as shown in FIG. 3.

In addition, in some embodiments one or more of the walls of the housing 102 (or portions thereof) may be configured to function as an antenna. For example, one or both of the walls 103, 104, and or the front wall 106 may include radiating elements that comprise an antenna. In such an arrangement, microstrip patch radiating elements may be well-suited for use. FIG. 6 is a perspective view of a conventional patch radiating element 220. As shown in FIG. 6, the conventional patch radiating element 220 is formed in a mounting substrate 210. The mounting substrate 210 comprises a dielectric substrate 212 having lower and upper major surfaces, a conductive ground plane 214 that is formed on the lower major surface of the dielectric substrate 212 and a conductive pattern 216 that is formed on the upper surface of the dielectric substrate 212 opposite the conductive ground plane 214. The patch radiating element 220 comprises a patch radiator 230 that is part of the conductive pattern 216, as well as the portion 222 of the dielectric substrate 212 that is below the patch radiator 230 and the portion of the conductive ground plane 214 that is below the patch radiator 230 (not visible in FIG. 6. A feed line 234 is coupled to the patch radiator 230. The feed line 234 may connect the patch radiating element 220 to a transmission line 218 such as, for example, a transmission line that is part of a feed network. The feed line 234 and the transmission line 218 are part of the conductive pattern 216 that is formed on the upper surface of the dielectric substrate 212.

Additional information regarding patch radiating elements is set forth in U.S. patent application Ser. No. 16/163,601, filed Oct. 18, 2018, the disclosure of which is hereby incorporated herein by reference in full. Other suitable radiating elements include, as examples, airstrip radiating elements, slot radiating elements and horn radiating elements.

In some embodiments, the materials of the housing 102 may be selected for compatibility with RF transmission, such as RF transparent materials. Moreover, the materials may be selected to eliminate or reduce PIM as described above. Such materials include non-metallic materials such as polymeric materials.

Further, in some embodiments one or more walls of the housing 102 may be formed of "tunable" dielectric materials. Such materials can be modified to be transparent to certain RF frequencies. In some embodiments, one or more walls of the housing 102 may be formed of different tunable materials, wherein each radio 110, 112 operates at a different frequency that is matched to the "tuned" frequency of one of the walls of the housing 102.

Referring now to FIGS. 7-10, another assembly comprising an advertising banner with a small cell base station, designated broadly at 300, is shown therein. The assembly 300 includes a housing 302. The housing 302 includes a cap **302*a* that includes side walls 303, 304, a front wall 306, a floor 307 and a ceiling 308. The cap 302*a*, which includes informational markings and therefore functions as an advertising banner, may be formed as a single open-ended box (see FIG. 8). The housing 302 also includes a rear wall 305 that covers the open end of the cap 302*a* to form a closed overall housing 302. A pair of brackets 315 are mounted to the rear surface of the rear wall 305 and are employed to mounted the assembly 300** to a mounting surface, such as a storefront marquee sign.

The assembly 300 also includes a plurality of rails 309 (four rails 309 are shown herein) that are mounted to the rear wall 305 and extend forwardly therefrom. The rails 309 fit within the "corners" of the cap **302*a* and can provide support thereto. A vertical member 311 with cutouts 313 is mounted between the upper and lower rails 309 toward the front end of the assembly 300 and divides the housing into front and rear chambers 302*f*, 302*r***.

In some embodiments the cap **302*a* is formed of a polymeric material. Typically, the housing 302 has dimensions of approximately between about 50 cm×50 cm×20 cm to 70 cm×70 cm×25 cm, but other dimensions may also be suitable. In one embodiment, the housing 302 is configured such that the overall size of the assembly 300** is approximately 60 cm×60 cm×20 cm.

Figure 8:
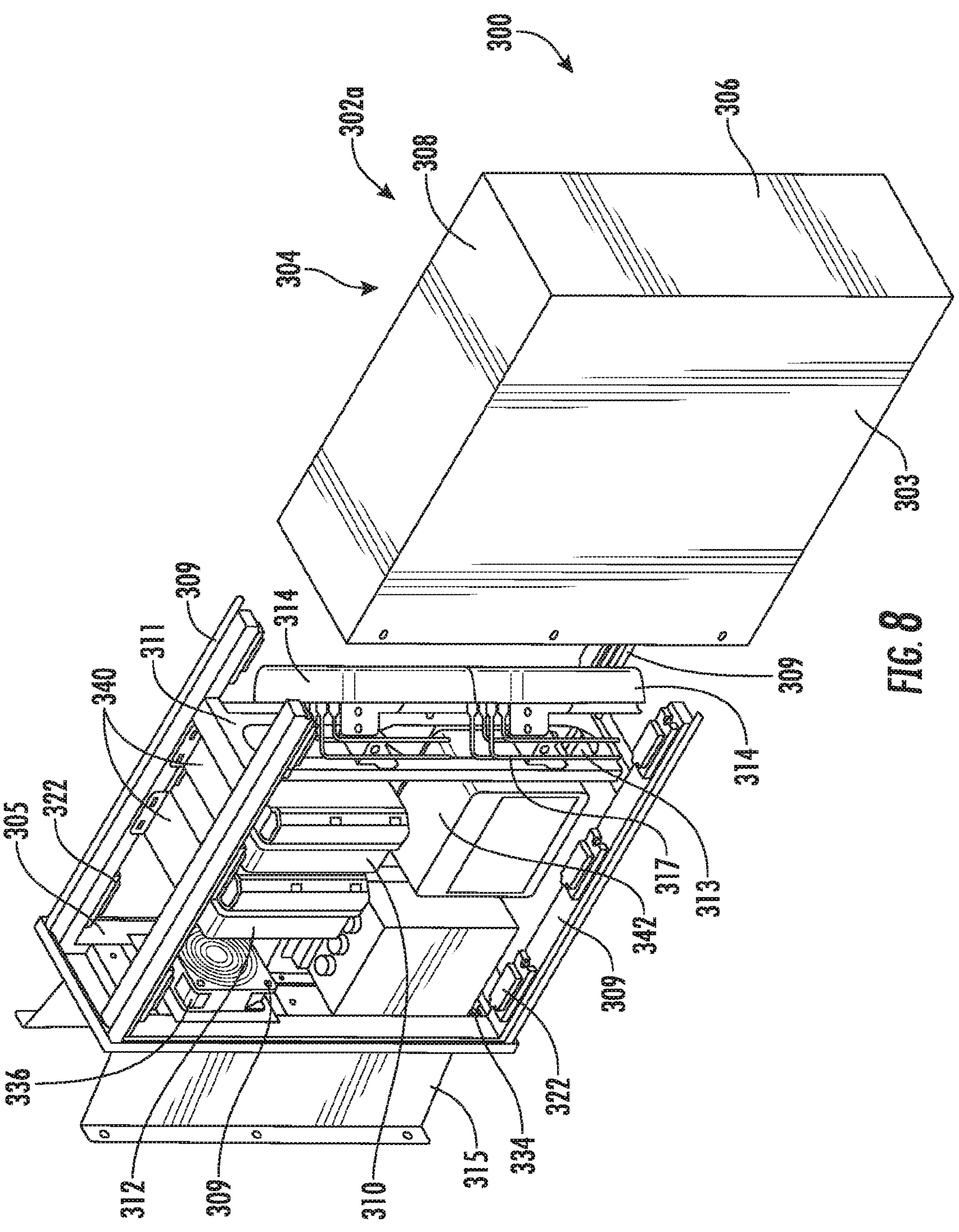
FIG. 8 is a front exploded perspective view of the advertising banner with a small cell base station of FIG. 7.
Figure 9:
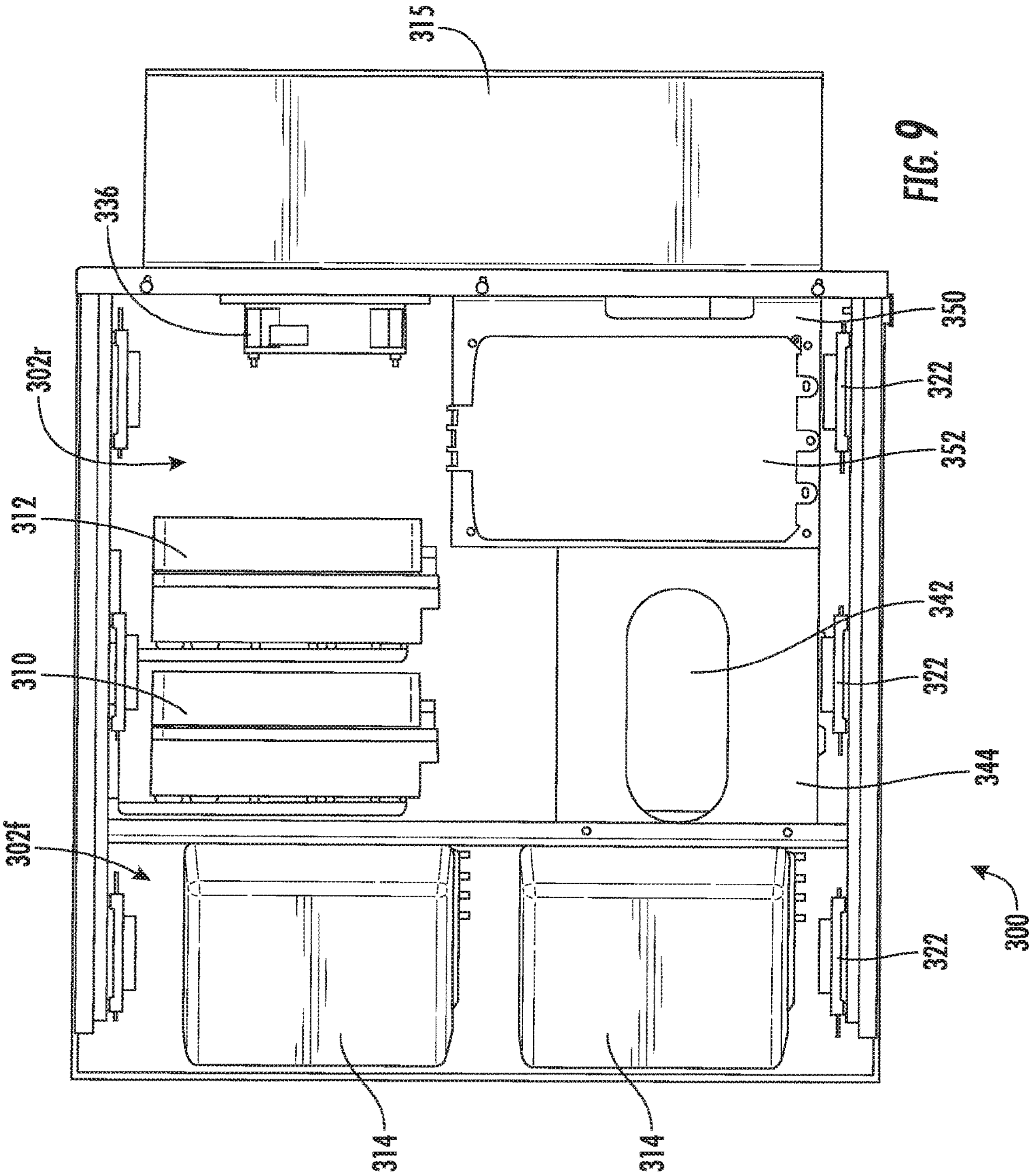
FIG. 9 is a side view of the advertising banner with a small cell base station of FIG. 7 with the housing shown in transparent line.
Figure 10:
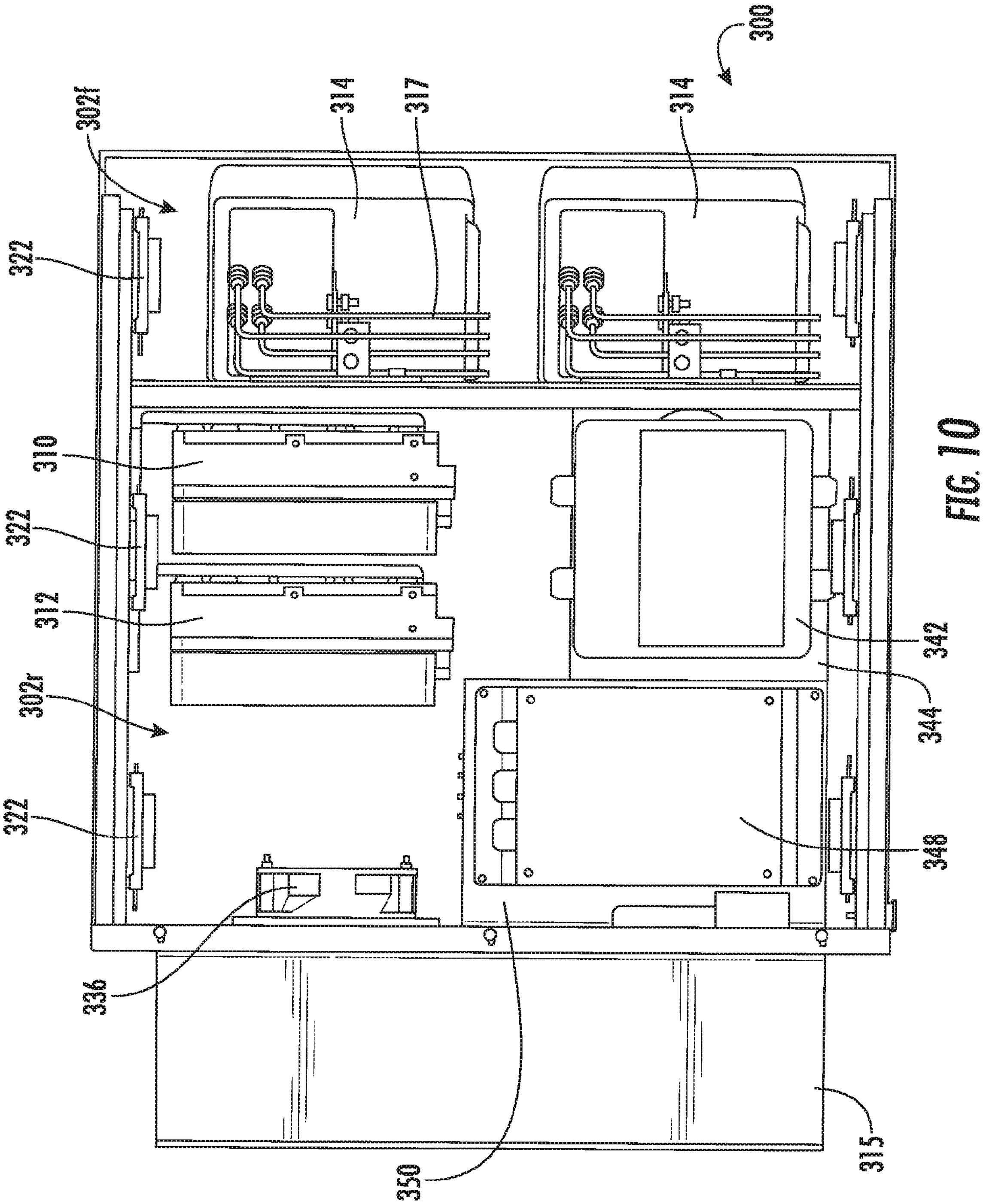
FIG. 10 is an opposite side view of the advertising banner with a small cell base station of FIG. 7 with the housing shown in transparent line.

As shown in FIGS. 8-10, a blower 336 is mounted on the front surface of the rear wall 305. Vents 334 are present in the lower end of the rear wall 305. Additional vents (not shown) are present in the rear wall 305 rearwardly of the blower 336 to enable air to circulate through the housing 302.

Two antennas 314 are mounted to the forward surface of the vertical member 311 within the front chamber **302*f*. Cables 317 are routed from the antennas 314 through the cutouts 313 in the vertical member 311 into the rear chamber 302*r* of the housing 302. The illustrated antennas 314 are flat panel antennas, and in illustrated embodiment are mounted at an oblique angle to the side walls 303, 304 and the front wall 306, which may enable them to fit within the front chamber of the housing 302. The antennas 314 may be pivotally mounted to the vertical member 311** so that they can rotate (either together or independently) to face in a desired direction.

The rear chamber **302*r* houses additional pieces of equipment required or useful for a small cell base station. As shown in FIGS. 7-10, the assembly 300 includes two radios 310, 312 that are mounted via L-shaped brackets 340 to the upper rails 309. The brackets 430 may be sufficiently flexible to accept radios 310, 312** of different sizes.

Figure 7:
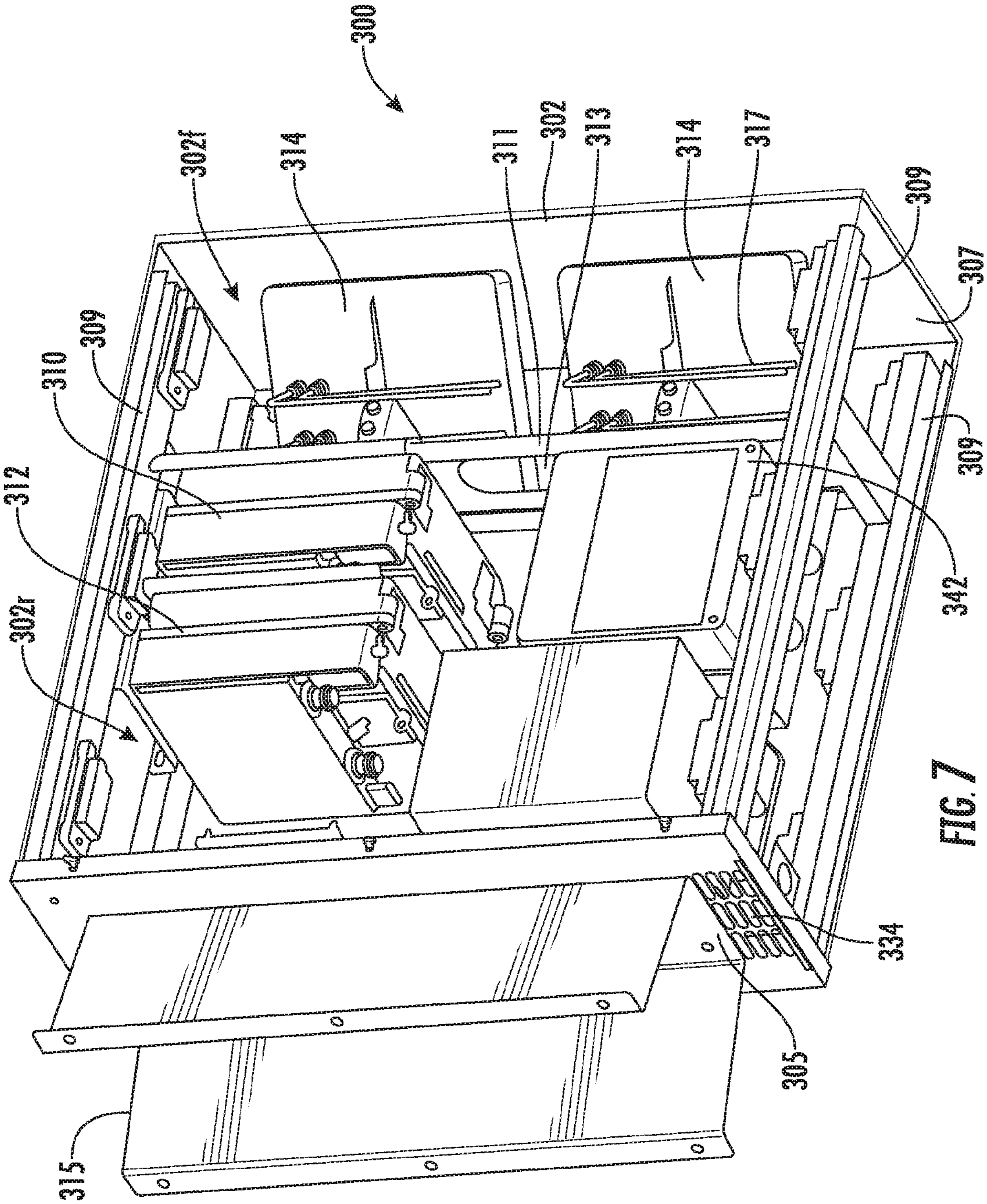
FIG. 7 is a rear perspective view of another advertising banner with a small cell base station according to embodiments of the invention with the housing shown in transparent line.

Also, as seen in FIGS. 7, 8, and 10, a circuit breaker box 342 is mounted below the radios 310, 312 via a wall 344 mounted to the rear surface of the vertical member 311. In addition, an optional RF combiner 348 is mounted to a wall 350 that extends forwardly from the front surface of the rear wall 305. A fiber splice tray 352 is mounted on the opposite side of the wall 350. In some embodiments, cabling (either power, fiber optic, or both) may be routed through one or more apertures in the floor 307 of the cap 302*a*, in the rear wall 305, and/or through another path. For example, power cables may be routed to the combiner 348 or the circuit breaker box 342, and fiber optic cables may be routed to the fiber splice tray 352.

It can also be seen in FIGS. 7-10 that LEDs 322 are mounted on the upper and lower rails 309. The LEDs 322 provide illumination within the housing 302 that lights the advertising indicia on the side walls 303, 304.

The formation of the cap 302*a* as a monolithic piece can provide easy access to the internal components to a technician. The cap 302*a* can be simply connected to the remainder of the assembly 300 (for example, with screws inserted into the rear wall 305 or other methods). The cap 302*a* can be removed by simply disconnecting it from the rear wall 305 and sliding the cap 302*a* forwardly until the rear end thereof clears the front ends of the rails 309. At this point all of the internal components of the assembly 300 are accessible. Once work is complete, the cap 302*a* can be replaced and refastened.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

That which is claimed is:

1. An assembly, comprising:

(a) a housing comprising a floor, a ceiling, a rear wall, a front wall, and opposed side walls that define a cavity, wherein the side walls include illuminable informational markings;

(b) an antenna;

(c) first and second radios residing in the cavity of the housing connected with the antenna; and (d) a power source attached to the radios;

wherein the power source is employed to illuminate the informational markings;

wherein the housing is mounted to a storefront; and wherein the housing is mounted to an illuminated sign of the storefront.

2. The assembly defined in claim 1, further comprising an optical signal source attached to the radios.

3. The assembly defined in claim 1, wherein the housing is mounted substantially perpendicularly to the storefront.

4. The assembly defined in claim 1, wherein the assembly has overall dimensions of between about 50 cm×50 cm×20 cm to 70 cm×70 cm×25 cm.

5. The assembly defined in claim 1, further comprising LEDs within the housing, the LEDs configured and positioned to illuminate the informational markings.

6. The assembly defined in claim 1, wherein the floor is perforated.

7. The assembly defined in claim 1, wherein the ceiling is mounted above upper edges of the sidewalls to create at least one gap therebetween.

8. The assembly defined in claim 1, further comprising a blower.

9. The assembly defined in claim 1, wherein the front wall, the side walls, the floor and the ceiling comprise a monolithic cap.

10. The assembly defined in claim 9, wherein rails are mounted to and extend forwardly from the rear wall and fit within the cap.

11. The assembly defined in claim 10, wherein LEDs are mounted to the rails to provide illumination to the informational markings.

12. The assembly defined in claim 1, wherein the antenna is a flat panel antenna.

13. The assembly defined in claim 12, wherein the antenna is mounted at an oblique angle to the side walls and the front wall.

14. The assembly defined in claim 1, further comprising at least one of a fiber optic splice tray, a circuit breaker, and a radio frequency combiner located in the housing.

15. The assembly defined in claim 1, wherein the cavity of the housing is accessible through one of the side walls of the housing.

16. An assembly, comprising:

(a) a housing comprising a floor, a ceiling, a rear wall, a front wall, and opposed side walls that define a cavity, wherein the side walls include illuminable informational markings;

(b) an antenna;

(c) a radio residing in the cavity of the housing connected with the antenna; and (d) a power source attached to the radio;

wherein the power source is employed to illuminate the informational markings;

wherein the housing is mounted substantially perpendicularly to an illuminated sign of a storefront via a bracket, the bracket being generally U-shaped in profile and mounted to the rear wall of the housing.

17. An assembly, comprising:

(a) a housing comprising a floor, a ceiling, a rear wall, a front wall, and opposed side walls that define a cavity, wherein the side walls include illuminable informational markings;

(b) an antenna;

(c) a radio residing in the cavity of the housing connected with the antenna; and (d) a power source attached to the radio;

wherein the power source is employed to illuminate the informational markings; and wherein the antenna is mounted at an oblique angle to the front wall and side walls.

18. The assembly defined in claim 17, wherein the antenna is a flat panel antenna.

* * * * *